Patented July 14, 1942

2,289,778

UNITED STATES PATENT OFFICE 2,289,778

POLYMERIZATION OF LOW MOLECULAR OLEFINS

Paul Herold, Leuna, Germany, assignor, by mesne assignments, to Standard Catalytic Company, a corporation of Delaware No Drawing. Application October 14, 1938, Serial No. 234,901. In Germany October 20, 1937

5 Claims. (Cl. 196—10)

The present invention relates to the polymerization of low molecular olefins and is in particular concerned with the production of liquid hydrocarbons suitable as motor fuels, such as benzines, from the said olefins.

In the known polymerization of olefins with strong mineral acids, such as sulphuric acid and the various phosphoric acids, the gaseous olefins usually used are often first absorbed in the acid and then, in a further stage, olefin polymers are formed from the resulting semi-esters by heating.

A direct polymerization of liquid olefins has also already been obtained by intense shaking or stirring with the said polymerizing agents; this is most successful with the more readily polymerizable olefins with tertiary carbon atoms.

In carrying out the said one-stage process in practice, however, the great difference in density between the initial material and the polymerizing agent has hitherto caused a high consumption of power and other drawbacks. Moreover the process is restricted to a discontinuous operation. It has therefore already been proposed to cause the liquid olefins in a finely divided state to pass through a thick layer of the polymerizing agent or vice versa.

The yields per unit of space and time obtainable by this method are, however, also unsatisfactory. Moreover there are other drawbacks, as for example clogging of the dispersing devices by the deposition of resinifying highly polymerized constituents.

I have now found that olefins, especially those having tertiary carbon atoms, can be converted into their dimers or also higher polymers very simply and without trouble in remarkably good yields with those strong inorganic multivalent acids which are liquid in the concentrated state, i. e. with sulphuric acid or phosphoric acid, and in particular with sulphuric acid, the said acids being employed in a medium or high concentration, when working in the following manner:— The olefins in the liquid state, i. e. liquid or liquefied gaseous olefins, if desired in admixture with saturated or other unsaturated hydrocarbons, are allowed to trickle together with the acids through high reaction chambers provided with filler bodies, the two liquid layers formed from the resulting liquid mixture by sedimentation are separated from each other and the lighter of the two is worked up by distillation or otherwise. The heavier layer may be used again for the reaction together with fresh initial material.

The reaction chamber, preferably in the shape of a tower, may be filled irregularly with shaped bodies of any shape, or may also be charged with uniformly shaped bodies effecting a good dispersion in a regular manner.

Among olefins having tertiary carbon atoms which may be polymerized with advantage in the said manner there may be mentioned those having from 4 to 8 or more carbon atoms; both aliphatic and cyclic olefins may be used. They may be used also in admixture with homologues or with other unsaturated or also with saturated hydrocarbons.

Generally speaking ordinary or slightly elevated temperature is used; a ready increase in temperature takes place spontaneously by reason of the heat of reaction set free in spite of water cooling. In some cases it may be advantageous to use higher temperatures up to 120° C. or more and correspondingly smaller acid concentrations; in this way the degree of polymerization may be kept lower.

The pressure to be used depends on the boiling point of the hydrocarbons to be worked up. In many cases atmospheric pressure may be used. In the reaction of low boiling hydrocarbons, increased pressure is used, however, especially when working at high temperatures at the same time. The pressure may be increased appreciably above the vapor pressure of the olefins used by pressing in gaseous hydrocarbons or other inert gases.

The nature and concentration of the polymerizing agent are of considerable influence on the polymerization action and the composition of the resulting products and consequently also on the choice of working conditions to be used.

Phosphoric acid reacts considerably more slowly than sulphuric acid of the same concentration. The difference in behaviour of the two acids becomes greater with increasing carbon number of the olefins to be worked up so that for example for isohexylene temperatures of more than 100° C. must be used with concentrated phosphoric acid, whereas with from 75 to 85 per cent sulphuric acid a sufficient polymerization is obtained already at from 30° to 40° C.

Stronger acids at lower temperatures usually yield products of a higher degree of polymerization, i. e. more trimers and higher polymers than dimers, whereas weaker acids at higher temperatures lead mainly to the formation of dimers. For this purpose sulphuric acid of a strength down to 50 per cent are suitable.

In the case of high acid concentrations and in the working up of isohexylenes and higher olefins, semi-esters cannot be detected in the polymerizing agents used. With decreasing carbon number and acid concentration, however, the circulating polymerizing agent acquires certain constant amounts of such esters after a certain time.

In all cases, however, the acid which has already been used has a better action than the fresh acid.

The relative proportions of the acid to the olefins to be polymerized may be varied within wide limits. Either the acid or olefins may be present in a large excess (with reference to equal parts by volume) without appreciably impairing the polymerization action.

The conversion of the olefins into their polymers is usually practically complete by a single passage through the reaction tower.

According to previous experience of olefin polymerization this action was not to be expected, in particular with polymerizing agents which have been used repeatedly; having regard to the great difference in density between the two liquids it is surprising and may be attributable to the fact that the liquid layers during their trickling down in the form of a thin film over the filler bodies constantly displace each other by reason of their different densities and viscosity so that a constant renewal of the contacting surfaces of the two liquids takes place.

With suitable lengths of tower (preferably 12 meters or more) conversions of more than 90 per cent up to 98 per cent may readily be obtained even with high throughputs.

For the preferential formation of dimers it may be advantageous to be content with a partial conversion and to obtain this by a more rapid throughput or by shortening the path of trickling or by both these measures.

From the upper layer of the reaction product it is preferable to separate the polymerized constituents by rectifying distillation; the residue remaining unchanged is again treated with acid.

The amount of polymerizing agent consumed is small; it usually amounts to a few per cent of the weight of the polymerization product obtained.

The polymerization products may be used for very many purposes. They may be used without further working up, or after separation into single fractions, or after a hydrogenation of the whole polymerization product or of the single fractions into the corresponding saturated hydrocarbons, as fuels or as additions for improving the non-knocking properties of fuels. They are also suitable as alkylation components for various synthetic reactions, in particular for the preparation of capillary-active substances for various purposes. The constituents of higher boiling point themselves yield bodies having the said properties, for example after sulphonation. The following examples will further illustrate how the said invention may be carried out in practice, but the invention is not restricted to these examples.

*Example 1*

60 liters of hot 60 per cent sulphuric acid at a temperature of 110° C. are led per hour into the top of a pressure-tight tube 12 meters long and 100 millimeters in internal diameter which is heat-insulated, lead-lined, filled with porcelain Raschig rings and under a pressure of hydrogen of 31 atmospheres. At the same time 70 liters of a preheated liquid mixture of 2 parts of isobutane and 1 part of isobutylene are pressed in at the upper end of the tube. The mixture of the two liquids entering at the lower end of the tube into a pressure-tight, lead-lined separation vessel at a temperature of 125° C. separates into two layers; the hot acid is pumped back and the lighter layer is cooled and washed. It contains 75 per cent of the isobutylene originally present as a mixture of 73 per cent of di-isobutylene, 24 per cent of tri-isobutylene and 3 per cent of higher polymers.

After the washing, isobutane and isobutylene are separated from the mixture in a pressure column; the isobutylene, after the addition of further isobutylene, is again pressed into the reaction tube.

*Example 2*

The initial material is an olefin mixture prepared by catalytic dehydration of a fraction boiling at from 145° to 165° C. and consisting mainly of primary isohexyl and isoheptyl alcohols of a product obtained in the synthesis of higher alcohols from carbon monoxide and hydrogen after the nature of the methanol synthesis.

90 liters per hour of this mixture are led into the top of a tower 14 meters high and 180 millimeters in internal diameter which is charged with filler bodies, provided with a jacket for cooling water and which is under atmospheric pressure. At the same time 100 liters of 85 per cent sulphuric acid which have already been used continuously in the same way are added at the top.

The two liquids leave the tower in admixture at a temperature of 39° C.; after sedimentation in a separation vessel, they are withdrawn separately. The acid is returned to the tower. The hydrocarbon mixture is subjected to a washing with dilute caustic soda solution and water; it has been converted to the extent of 96 per cent into polymeric olefins consisting to the extent of 91 per cent of dimers and to the extent of 9 per cent of trimers and quite a small amount of higher polymers.

*Example 3*

A technical isoheptylene obtained from the same source as the initial material of Example 2 is worked up in the same plant under the following conditions.

The trickling tower is kept slightly above 0° C. by strong cooling with cooling medium and charged per hour with 50 kilograms of olefin and 50 kilograms of 93 per cent sulphuric acid, the latter in circulation.

After passage through the tower, the isoheptylene is polymerized to the extent of 92 per cent, namely to the extent of 17 per cent into dimers and to the extent of 55 per cent into trimers; the remainder consists of higher polymers which boil up to 360° C. without interruption.

What I claim is:

1. A process for the polymerization of low molecular olefins with a strong inorganic multivalent acid which when in the concentrated state is present in the liquid state, which comprises allowing such olefin to trickle together with such acid through a high chamber charged with a material having a dispersing action while avoiding substantial vaporization of the olefin, collecting the liquid having passed through the chamber and separating from each other the layers of the said liquid formed by sedimentation.

2. In the process as claimed in claim 1, working with an acid of from medium to high concentration.

3. In the process as claimed in claim 1 working with sulphuric acid of from medium to high concentration.

4. In the process as claimed in claim 1, treating an olefin having a tertiary carbon atom.

5. In the process as claimed in claim 1, treating an olefin containing from 4 to 8 carbon atoms of which one is a tertiary carbon atom.

PAUL HEROLD.